United States Patent [19]

Barajas et al.

[11] Patent Number: 4,673,532

[45] Date of Patent: Jun. 16, 1987

[54] ROSIN-FREE SOLDER COMPOSITION

[75] Inventors: Felix Barajas, Huntington Beach; Donald W. Bridges, Irvine, both of Calif.

[73] Assignee: McDonnell Douglas Corporation, Long Beach, Calif.

[21] Appl. No.: 821,231

[22] Filed: Jan. 22, 1986

[51] Int. Cl.$^4$ ............................................... A01B 1/06
[52] U.S. Cl. .................................. 252/512; 252/514; 252/500
[58] Field of Search ...................... 252/512, 514, 500; 148/23-25; 106/1.05, 1.18, 1.19

[56] References Cited

U.S. PATENT DOCUMENTS

| | | | |
|---|---|---|---|
| 4,391,742 | 7/1983 | Steigerwald et al. | 252/512 |
| 4,535,012 | 8/1985 | Martin et al. | 252/514 |
| 4,595,604 | 6/1986 | Martin et al. | 252/514 |
| 4,595,605 | 6/1986 | Martin et al. | 252/512 |
| 4,595,606 | 6/1986 | Martin et al. | 252/514 |

*Primary Examiner*—Josephine L. Barr
*Attorney, Agent, or Firm*—Max Geldin

[57] ABSTRACT

A solder composition or solder cream especially adapted for vapor phase soldering in electronic circuits without formation of organic residues, comprises a major portion of finely divided solder metal and a minor portion of a fluorinated tertiary alkylamine. Preferably, the composition consists essentially of 85 to 90% of solder metal and 10 to 15% of perfluorotrihexyl amine. A small amount of an organic brominated activator such as homocyclohexane, can be added to convert any lead oxide or tin oxide present in the solder metal, to the corresponding bromides, and a small amount of solvent can be incorporated to disperse the activator in the solder composition. The fluorinated amine vehicle of the solder cream is compatible with and dissolves in the perfluorotriamyl amine, commonly used as the heating medium in vapor phase soldering, and the amine vehicle, perfluorotrihexyl amine, can be recovered from the solution by distillation, for reuse.

14 Claims, No Drawings

ROSIN-FREE SOLDER COMPOSITION

BACKGROUND OF THE INVENTION

This invention relates to novel solder compositions or solder creams, and is particularly concerned with the provision of solder compositions especially adapted for soldering components in microelectronic circuits, and wherein the use of fluxes, particularly rosin type flux, is avoided.

A solder cream is a material that is capable of being applied to a substrate or surface in a specific pattern using screening or analogous methods which can subsequently undergo fusing to provide an electrical joint or interface commonly described as a solder joint. The solder cream generally consists of metallic particles of various alloys such as tin-lead, tin-lead-silver, etc., contained in a vehicle including a flux such as wood rosin, or derivatives thereof.

Currently, microelectronic circuits are made by surface mounting chip carriers and other components on ceramic and plastic substrates by vapor phase soldering. Circuits similar to those used on printed circuit boards are produed on the substrates. In certain instances, the circuit is located on one side of the substrate, with pads being provided in certain areas, other parts of the circuit being covered with an insulating material.

The solder cream having a paste-like consistency is applied, for example by means of a silk screen, to the pads on the circuit board. Thereafter, the electronic components are carefully positioned with their peripheral contacts on the solder cream-coated pads. When all of the components are thus in place, the board, with such components temporarily positioned and retained thereon by the solder cream, can be placed in a vapor reflow system and subjected to a sufficiently high temperature to cause the metal content of the solder cream to liquefy and the contacts of the electronic components to be fused and to adhere to the pads on the circuit board. Examples of solder compositions are described in U.S. Pat. No. 3,684,533 to Conwicke and U.S. Pat. No. 4,373,974 to Barajas.

However, solder creams presently utilized, such as those of the above patents, contain flux constituents which char during soldering and coat the circuits with electrically conductive matter, causing shorts if not completely removed in post-soldering cleaning.

Thus, fluxes generally contain rosins which are difficult to clean from substrates or circuit boards. If one attempts to reflow the solder using infra-red, the light frequencies are translucent to the flux, and tend to bake the rosin on the boards, making it extremely difficult to remove or clean the baked-on rosin residue. If vapor phase soldering is used to reflow the solfer, the tendency is to pre-bake the flux, creating the same undesirable residue which is difficult to remove. Further, where solvents are employed to remove such residues, the solvent vapors are hazardous in work areas.

Since the reflow soldering process has many advantages such as temperature stability under inert atmosphere conditions, it was sought to enhance the process to particularly avoid the above noted problems associated with deposition and removal of char residue from circuit boards. It was considered particularly desirable to replace the rosin type flux employed in solder creams used in electronic circuitry, with a material more compatible with certain liquid fluorinated compounds such as perfluorotriamyl amine, often used in vapor phase soldering as the vapor reflow medium for heating the solder cream to liquefy same.

It is accordingly an object of the present invention to provide an improved solder composition or solder cream which is especially adapted for soldering components in electronic circuitry, particularly microelectronic circuits.

Another object is the provision of a solder composition of the above type which avoids formation of residues formed on substrates or circuit boards following vapor phase soldering operations.

A still further object of the invention is to provide an efficient solder composition of the above type especially designed for use in vapor phase soldering operations and which utilizes a vehicle for the solder composition which is free of rosin or rosin type flux components, such vehicle being compatible particularly with certain fluorinated compounds employed as the heating medium in vapor phase soldering.

Yet another object is the provision of a vapor phase soldering process employing an improved solder composition of the above type, in conjunction with certain fluorinated compounds employed to provide the vapor phase reflow medium.

SUMMARY OF THE INVENTION

It has now been found that the above objects and advantages can be achieved according to the invention by the provision of a soldering composition containing a major portion of finely divided solder metal and a minor portion of a fluorinated tertiary alkylamine which is semi-solid at room temperature and which confers a creamy consistency on the composition at room temperature. A particularly advantageous amine for purposes of the invention is a perfluorotrihexyl amine.

A solder composition or solder cream formulated according to the present invention contains no char-forming constituents such as rosins, and is especially suitable for vapor phase soldering. Since no organic residues are formed following soldering when employing the solder composition of the invention, no elaborate cleaning procedure is required to remove char residues from circuit boards after soldering. Further, a substantial portion of the fluorinated amine component employed as vehicle in the solder composition of the invention can be reclaimed for reuse following vapor phase soldering.

DETAILED DESCRIPTION OF THE INVENTION AND PREFERRED EMBODIMENTS

The fluorinated tertiary alkylamine component functioning as vehicle for the solder composition of the invention is a compound which is semi-solid at room temperature and has viscosity characteristics which facilitate mixing the solder metal with such vehicle at about room temperature and gives creaminess to the solder cream following admixture with the solder metal, for easy application, e.g. to pads on a circuit board.

The fluorinated tertiary alkylamine is preferably a perfluorinated trialkyl amine containing from 4 to 8 carbon atoms. Most desirably, the material employed is perfluorotrihexyl amine, marketed as FC71 by 3M Co. This material is understood to comprise the straight chain and branched chain isomers, and also mixtures thereof. This material has a boiling range of about 250° to about 255° C., e.g. about 253° C. While being semi-solid at about room temperature, the FC71 commences to turn liquid at slightly elevated temperature of about 25° to about 30° C.

In addition to having the important advantage of not forming carbonaceous residues on circuit boards or substrates following vapor phase soldering, the fluorinated tertiary alkylamine vehicle component of the solder composition of the invention is compatible and completely miscible with another related fluorinated tertiary alkylamine, most desirably perfluorotriamyl amine, having a lower boiling point than the fluorinated vehicle component and employed as the liquid medium which is vaporized in the vapor reflow system, to provide the heated vapor phase medium during soldering. Thus, during vapor phase soldering, the fluorinated amine vehicle of the solder composition liquefies and drains into the liquid perfluorotriamyl amine liquid medium in the vapor phase soldering machine and dissolves therein. Such medium containing the dissolved fluorinated vehicle, e.g., the perfluorotrihexyl amine, can then be subjected to distillation to separate and distill off the lower boiling perfluorotriamyl amine, and the recovered higher boiling fluorinated amine, e.g. FC71, can be reused.

The solder compositions of the invention contain finely divided solder metals in the form of metallic balls or particles, dispersed in the vehicle. The solder metals can be any of the conventional single or multiphase metals normally used for soldering, particularly tin, lead and silver, and alloys and mixtures thereof. Alloys or mixtures of tin-lead, tin-lead-silver, tin-silver, lead-silver and lead-tin, for example, can be employed. A preferred mixture of solder metals employed in the solder composition of the invention consists essentially of a mixture of lead, tin and silver, which can contain from 61.5 to 62.5% tin, 1.75 to 2.25% silver, and the balance lead. A particularly preferred solder metal mixture consists of 36% lead, 62% tin and 2% silver. Another preferred solder metal consists of 63% lead and 37% tin.

The solder metal particles should be finely divided, preferably having a particle size ranging from about 0.2 to about 100 microns, e.g. about 40 to about 70 microns, in diameter. The metal particles are preferably round rather than oval or irregular, since oval or irregular particles clog the screens, whereas round particles pass freely through the screen. Thus, with round particles proper flow of the metallic particles through the screen takes place.

The two essential components of the solder composition of the invention, the finely divided solder metal and the fluorinated tertiary alkylamine vehicle, are employed in a range of proportions of 85 to 90% solder metal and 10 to 15% of the fluorinated alkylamine, by weight of the sum of the two components. Since as noted above, the FC71 perfluorotrihexyl amine material is comprised of one or more isomers, it has been found that the amount of such material employed to obtain the desired viscosity characteristics can vary within the above noted 10 to 15% range, depending upon the particular isomers present.

Although the above defined fluorinated amine compound is the sole vehicle component employed, in preferred practice minor amounts of other substances can be incorporated in the soldering composition of the invention to provide improved efficiency in vapor phase soldering according to the invention. Thus, a small amount of an organic brominated activator compound can be incorporated in the solder composition, which functions to react with and reduce any lead oxide and tin oxide in the solder metal powder during vapor phase soldering and convert such oxides to the corresponding bromides, which can be washed away from the solder joint to prevent contamination thereof. Thus, an organic bromide such as bromocyclohexane or bromocamphor can be employed for this purpose. The amount of such material employed can range, for example, from about 0.1 to about 1% by weight of the total or overall solder composition. A nonionic fluorinated alkylester, e.g. the material marketed as FC-430 or FC-431 by 3M Co., can be employed in the solder composition as a surfactant and scavenging agent to take up and wash away such lead and tin bromides.

A solvent such as isopropyl alcohol can also be added to disperse the activator in the solder composition. Such solvent can also aid to achieve the desired viscosity for the solder composition, for example a viscosity of the order of about 500,000 centipoises at 20° C. The amount of solvent employed can range from about 2 to about 15 parts, e.g. 10 parts, per part of activator, by weight.

The solder compositions of the invention are prepared by admixing the solder metal and the fluorinated amine component and other optional components together in the ranges and amounts noted above.

Thus, for example a so-called dry box can be employed in which is deposited a quantity of the vehicle consisting of fluorinated tertiary alkylamine, particularly perfluorotrihexyl amine, according to the invention. The metallic component of the solder cream can be in the form of a wire dispensed from a supply into a melting pot or crucible from which molten metal alloy flows through a bottom orifice into a stream of nitrogen gas and is reduced to small spherical particles ranging in diameter from about 0.2 to about 100 microns. The desired size metallic particles are then dispensed in the vehicle, in the desired proportions, and are mixed with the vehicle by means of a suitable mixer apparatus.

While the above illustrates one method of forming and combining the desired metallic particles with the vehicle to produce the solder cream, in practice, other similar methods may be used. This operation preferably is carried out within an inert atmosphere, e.g., nitrogen, or the like, substantially to aid in minimizing oxidation of the metallic particles and to produce a solder cream substantially free of oxides which tend to inhibit attachment to the contacts of the chip carriers and the pads on the circuit boards, and to eliminate contaminated solder joints.

The solder compositions of the invention can be employed for efficiently soldering microelectronic components such as capacitors, resistors, integrated circuits and their packages or carriers, transistors, diodes, etc., onto a circuit, carried on a substrate, in vapor phase soldering operations. The soldering compositions also can be used in automated vapor phase soldering, e.g., for automobile assembly and electrical connectors, and also can be used in automated assembly of jewelry and for package sealing.

The solder composition of the invention can be applied to any auitable substrate such as metal pads on a circuit board to which contacts of electronic components are to be soldered. Such application of the solder composition or solder cream can be made by use of metal screening to apply the solder cream to the pads. However, other modes of applying the solder cream in addition to screen printing can be employed, including, for example, dipping the objects to be soldered into the solder composition, or employing syringe techniques.

Thereafter, the solder is heated to a temperature at which the solder metal becomes molten and a highly adherent fused solder bond is formed. For this purpose, vapor phase soldering is a preferred method, although other methods of heating the solder such as the use of belt furnaces, and infra-red heating can be employed. Any atmosphere for heating can be used, e.g., air, or an inert atmosphere employing an inert gas such as nitrogen.

As previously noted, the soldering operation employing the soldering composition of the invention is preferably utilized in a vapor phase soldering operation utilizing a second fluorinated compound such as perfluorotriamyl amine as the heating medium and atmosphere.

The following table shows examples of soldering compositions according to the invention.

TABLE

| COMPOSITIONS | A | B | C | D | E |
|---|---|---|---|---|---|
| FC71 (vehicle) (weight %) | 14 | 13 | 12 | 13.5 | 11 |
| Metal (40–70 micron particle size) (weight %) | 86 | 87 | 88 | 86.5 | 89 |
| Lead | 36 | 63 | 36 | 63 | 36 |
| Tin | 62 | 37 | 62 | 37 | 62 |
| Silver | 2 | — | 2 | — | 2 |
| Bromocyclohexane (wt. % of total composition) | — | 0.5 | 0.2 | 0.3 | 0.6 |
| Isopropyl alcohol (wt. % of total composition) | — | 5 | 2 | 3 | 5 |

The following are specific examples of practice of the invention:

EXAMPLE I

In producing solder composition or solder cream A of the above Table, a lead-tin-silver metallic mixture in the proportions of 36% lead, 62% tin and 2% silver, is formed into a very finely divided powder as described in detail above.

The metallic powder is blown into a chamber, the metal balls are screened so that the particle size thereof is between 40 and 70 microns, and the particles are then mixed with the FC71 vehicle, such operations being carried out in an inert atmosphere, e.g., of nitrogen, to aid in substantially reducing oxidation of the metals. In this example, the vehicle and metal mixture are combined in a percentage of 14% of the vehicle and 86% of the metallic mixture, by weight.

The solder cream is used to secure miniature electronic components to a ceramic substrate. A printed circuit is produced on the substrate. The circuit is on one side of the substrate, with pads composed of platinum and gold being provided in certain areas, other parts of the circuit being covered with an insulating material.

The screen is placed over the circuit and the pads, and the above solder cream is screened onto the pads on the circuit board. Thereafter, electronic components including capacitors and resistors are carefully positioned with their peripheral contacts on the solder cream-coated pads.

The circuit board with the electronic components temporarily positioned and retained thereon by the solder cream, is placed in a chamber of a vapor phase reflow system containing liquid perfluorotriamyl amine (FC70) in the bottom of the chamber. The FC70 liquid is then heated by suitable means such as eleccric heating coils to a temperature of 215° C., producing boiling and vaporization of the FC70, the vapors ascending into the upper portion of the chamber and heating the ceramic substrate and the solder cream thereon. This results first in the melting and liquefaction of the perfluorotrihexyl amine (FC71) vehicle of the solder cream, which drains off the ceramic substrate into the liquid FC70 in the bottom of the chamber, and dissolving in such liquid. Since the metal mixture or alloy employed in the solder cream has a melting range between 177° C. and about 189° C., the system temperature melts the metallic particles in the solder cream and the solder alloy particles coalesce to form a solder joint, fusing or adhering the contacts of the electronic components to the pads on the circuit board, leaving the components securely positioned in place and soldered to the pads on the board.

Following the soldering operation, it is observed that all of the contacts are securely soldered to the pads, and the solder joints are clean with no char or residue coating on the solder joints, electronic components or the circuits. Hence, no special cleaning of the circuit board is required following vapor phase soldering, to remove any such deleterious matter.

Any unreacted activator removed from the solder cream during vapor phase soldering and passing into the liquid FC70 is insoluble therein and settles in the bottom of the soldering system, together with small amounts of tin and lead bromides and oxides. Such insoluble matter is continuously removed from the machine by filtration. During operation, periodically a portion of the FC70 fluid is removed and subjected to distillation, to separate the dissolved FC71 from the FC70.

EXAMPLE II

The vapor phase soldering procedure of Example I is followed employing respectively, solder compositions B through E of the above Table.

Substantially the same results are obtained, namely, effective soldering of the electronic components occurred, with no formation of vehicle residue on the solder joints, electronic components or circuits.

From the foregoing, it is seen that the invention provides a novel solder composition employing a fluxless or rosin-free vehicle in the form of an organic fluorinated amine, particularly perfluorotrihexyl amine, which results in clean solder joints following vapor phase soldering, with essentially no deposition of organic residues, and avoiding the necessity of removal of any such residues. The above fluorinated amine has advantageous properties similar to conventional rosin fluxes such as pine rosin, while avoiding the residue forming disadvantages thereof. The fluorinated amine vehicle can be readily blended with particulate solder alloys into a solder cream or paste which permits stencilling intricate patterns on substrates to serve as solder pads. Moreover, the fluorinated amine vehicle of the solder cream of the invention is compatible with and dissolves in the perfluorotriamyl amine (FC70), a closely related fluorinated fluid, commonly used as the heating medium in soft-solder vapor phase soldering.

While particular embodiments of the invention have been described for purposes of illustration, it will be understood that various changes and modifications within the spirit of the invention can be made, and the invention is not to be taken as limited except by the scope of the appended claims.

What is claimed is:

1. A solder composition especially adapted for soldering components in electronic circuits, which comprises 85 to 90% of finely divided solder metal and 10 to 15% of a perfluorinated trialkyl amine containing from 4 to 8 carbon atoms, by weight of the sum of the two components, and which alkylamine is semi-solid at room tempeature and confers a creamy consistency on the composition at room temperature, said composition being free of rosin flux.

2. The solder composition of claim 1, said perfluorinated trialkyl amine being a perfluorotrihexyl amine.

3. The solder composition of claim 2, said perfluorotrihexyl amine being selected from the group consisting of the straight chain and branched chain isomers, and mixtures thereof.

4. The solder composition of claim 1, containing 86 to 88% of solder metal and 12 to 14% of said perfluorinated trialkyl amine, by weight of the sum of said two components.

5. The solder composition of claim 1, said solder metal selected from the group consisting of tin, lead and silver, and alloys and mixtures thereof.

6. The solder composition of claim 1, including a small amount of an organic brominated activator compound which reacts at soldering temperature with any lead oxide or tin oxide present in the solder metal, to convert said oxides to the corresponding bromides, and a small amount of a solvent to disperse said activator in the solder composition.

7. The solder composition of claim 1, including about 0.1 to about 1% of a brominated activator selected from the group consisting of bromocyclohexane and bromocamphor, by weight of the composition, and about 2 to about 15 parts of a solvent to disperse said activator in the solder composition, per part of activator, by weight.

8. The solder composition of claim 4, including about 0.1 to about 1% of a brominated activator selected from the group consisting of bromocyclohexane and bromocamphor, by weight of the composition, and about 2 to about 15 parts of a solvent to disperse said activator in the solder composition, per part of activator, by weight.

9. The solder composition of claim 6, including a small amount of a surfactant as scavenging agent for said bromides.

10. A solder composition especially adapted for soldering components in microelectronic circuits, which consists essentially of 85 to 90% of finely divided solder metal having a particle size ranging from about 0.2 to about 100 microns, 10 to 15% of a perfluorotrihexyl amine vehicle selected from the group consisting of straight chain and branched chain isomers, and mixtures thereof, by weight of the sum of said two components, about 0.1 to about 1% of an organic brominated activator selected from the group consisting of bromocyclohexane and bromocamphor, and about 2 to 15 parts of isopropyl alcohol as solvent, per part of activator, by weight.

11. The solder composition of claim 10, containing 86 to 88% of solder metal and 12 to 14% of said perfluorotrihexyl amine, by weight of said two components.

12. The solder composition of claim 11, including a small amount of a surfactant as scavenging agent for said bromides.

13. The solder composition of claim 1, said finely divided solder metal having a particle size ranging from about 0.2 to about 100 microns.

14. The solder composition of claim 1, said finely divided solder metal having a particle size ranging from about 4 to about 7 microns.

* * * * *